Aug. 3, 1965   P. R. HOFFMAN   3,199,092
ELECTROMAGNETIC TRANSDUCER APPARATUS
Filed Dec. 30, 1960   8 Sheets-Sheet 1

Fig.1

INVENTOR.
PAUL R. HOFFMAN
BY
Carl Fissell Jr.
AGENT

Aug. 3, 1965  P. R. HOFFMAN  3,199,092
ELECTROMAGNETIC TRANSDUCER APPARATUS
Filed Dec. 30, 1960  8 Sheets-Sheet 3

INVENTOR.
PAUL R. HOFFMAN
BY
Carl Fissell Jr.
AGENT

INVENTOR.
PAUL R. HOFFMAN
BY
Carl Fissell Jr.
AGENT

Aug. 3, 1965 P. R. HOFFMAN 3,199,092
ELECTROMAGNETIC TRANSDUCER APPARATUS
Filed Dec. 30, 1960 8 Sheets-Sheet 5

INVENTOR.
PAUL R. HOFFMAN
BY
AGENT

INVENTOR.
PAUL R. HOFFMAN

United States Patent Office 3,199,092
Patented Aug. 3, 1965

3,199,092
ELECTROMAGNETIC TRANSDUCER
APPARATUS
Paul R. Hoffman, Woodlyn, Pa., assignor to Burroughs
Corporation, Detroit, Mich., a corporation of Michigan
Filed Dec. 30, 1960, Ser. No. 79,631
2 Claims. (Cl. 340—174.1)

This invention relates broadly to electromagnetic recording and reproducing apparatus, and more particularly, to electromagnetic recording and reproducing apparatus for use with record members which have multiple recording tracks disposed thereon. With still more particularity, the invention has to do with means for automatically selecting an individual recording track from among a plurality of tracks on such recording members and for positioning an electromagnetic transducer in operative association relative to a selected track.

An important object of the present invention is to provide electromagnetic transducer apparatus for use with disc or drum type record members.

Another important object of the invention is to provide automatic track selection and transducer positioning means for use with disc or drum type recording apparatus.

In accordance with the foregoing objects, and first briefly described herein, there is provided electromagnetic transducer apparatus for use with disc or drum type recording members which may be provided with a plurality of recording-reproducing areas thereon and comprising electromagnetic means for controlling the movement of a flexible band or tape operably associated with a transducer member thereby to automatically index the transducer member relative to the surface of a record member to position the transducer member in operative recording-reproducing relationship with a pre-selected area on such record member.

The foregoing and other features will be better understood from the following detailed description and the accompanying drawings, of which.

*Structural description*

Referring to the drawings and first to FIGS. 1 and 2 thereof which will be discussed simultaneously, the preferred embodiment of the invention hereindescribed is seen to comprise a movable record member 10 which is illustrated herein as a disc. It is to be understood, however, that the inventive concept includes discs, drums, tapes and/or ribbons. Thus the member 10 might well be any type of movable recording medium. The member 10 is provided with a magnetizable recording-reproducing surface 12, such for example, as ferromagnetic material of suitable thickness and magnetic retentive properties. The magnetizable surface 12 is adapted to be provided, as will hereinafter be described, with a plurality of individual recording tracks 14, for purposes also to be described later. Obviously, the tracks 14 have existence as such only after the disc has been recorded upon. The disc 10 is mounted for rotation on a shaft or spindle 16, as by bolts 18. Shaft 16 may for practical purposes be the drive shaft of an electric motor 20. The motor 20 is or may be a conventional type having a speed in the order of 3600 r.p.m.'s or faster for purposes which will become more apparent as the description proceeds.

A transducer carriage 22 adapted to carry one or more electromagnetic recorder-reproducer heads 24, only one head 24 being illustrated herein for clarity, is slidably movable, i.e., shiftable back and forth, as will be explained presently, along upper and lower guide members, such as rails 26 and 27 respectively. Electrical input-output lead wires 28 for the head or heads 24 are brought out along the head body into a flat bundle, FIG. 1, which lies along and is secured to a slanted support member 29. The transducer guiding members 26 and 27 are supported at their opposite ends in standoff blocks or pedestals 30—30. The pedestals 30—30 are secured by bolts 32 on one side surface of a vertically disposed, rigid, panel member 34 of metal or similar material. The panel 34 is supported perpendicularly on a similar flat base member 34' by bolts 35. Support 29 is secured in a known manner to panel 34. The motor drive shaft 16 projects forwardly through an aperture, not shown, in the panel 34, so that the disc 10 when rotating, is free and clear of other associated apparatus, to be described hereinafter.

Figure 4:
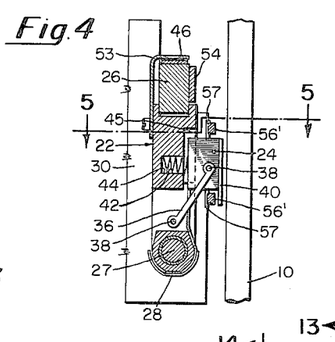
FIG. 4 is a sectional view along the line 4—4 of FIG. 1.

As seen in FIG. 4, each recorder-reproducer head 24 is pivotally mounted on the movable transducer carriage 22 by means of oppositely disposed mounting arms 36—36, only one of which is shown, which are attached at one end to the carriage 22 and at their opposite ends to the head structure itself by means of the pivot pins or bolts 38. The head carriage 22, as before mentioned, may include a plurality of heads 24, each of which may, if desired, be similar in construction and configuration to the head structure described and claimed in Patent No. 2,957,051 to Herman Epstein and Oscar B. Stram, or in Patent No. 2,950,354 to Otto Hohnecker, both of which are assigned to the same assignee as the present application. Such recorder-reproducer heads are provided, as is the present head 24, with a shoe portion 40 which coacts with the air film generated on the surface of the record member 10 by its high speed rotation to cause the head to ride or float upon the air film. The head or heads 24 are biased toward the recording member 10 by means of a coil spring 42 which is retained within a cylindrical opening 44 at the base of a recess 45 within the carriage structure 22. This mounting prevents the head from wobbling or yawing during its sliding movement.

Transducer carriage 22 is adapted to be automatically, incrementally movable, i.e., slidable as before mentioned, by means to be described hereinafter, laterally over the surface of the disc or drum without physical contact therebetween. To this end, and so that a visible indication may at all times be had of the exact location of the head relative to a specific area or track 14 on the disc, there is shown in FIG. 2 a demountable scale member 46. The scale 46 is divided arbitrarily and for convenience into 100 lines or marks 48. Each line 48 corresponds to and represents one of the 100 tracks 14 on the disc 10. The scale 46 is secured to the panel member 34 by bolts 50. A pointer member 53 carried by the head carriage 22 moves back and forth across the scale 46 with the head thus to indicate the exact position or location of the head relative to each of the tracks on the disc. For test purposes, e.g., when the disc is not attached to the drive apparatus, or when otherwise desired, a second scale 54, FIG. 1, similar to scale 46 may be secured to the upper front edge portion of rail 26 as by bolts 55.

Figure 1:
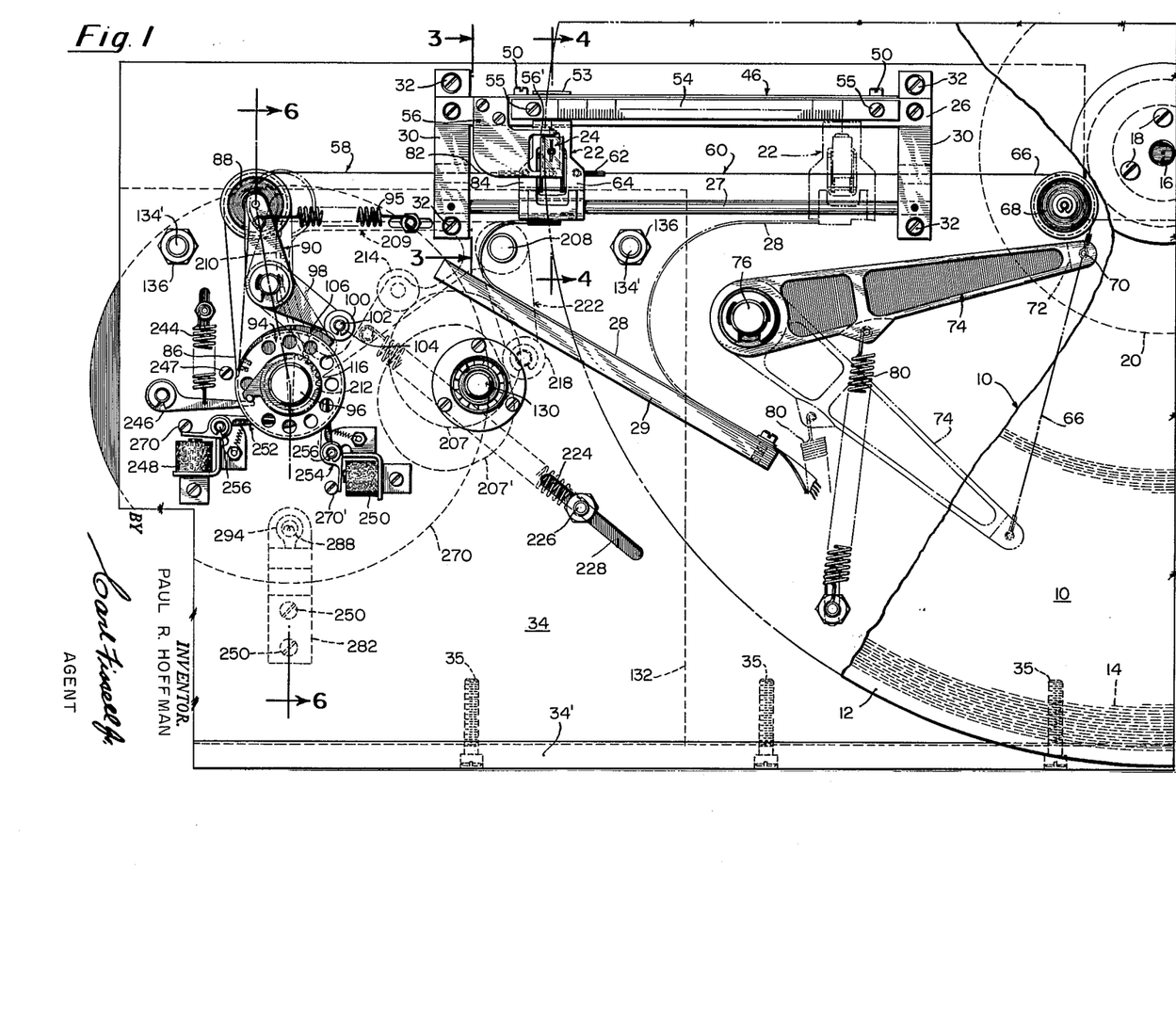
FIG. 1 is a side elevational view of an electromagnetic transducer positioning apparatus embodying the present invention.

A bifurcated camming plate 56, FIG. 1, provided with a pair of forwardly extending parallel arms or camming fingers 56'—56' is secured to the upper rail or guide member 26, as by bolts. As seen most clearly in FIG. 5 the camming fingers 56'—56' project outwardly away from the plate and are engageable with oppositely disposed lugs or pins 57—57 projecting outwardly from opposite ends of the head structure 24. As will be explained hereinafter, when the head carriage is retracted, leftwardly in FIG. 1, to its home or rest position, the slanted forward ends of the camming fingers 56'—56' slide against the pins 57 lifting or retracting the head a few thousandths of an inch away from the surface 12 of the disc 10 thus preventing any accidental contact with or damage to the disc and/or the head due to unevenness or runout on the disc surface.

A transducer carriage traversing or head set up mechanism for the present apparatus comprises a number of sub-assemblies which will be described conjointly hereinafter. The traversing mechanism includes, among other things, two lengths or strips of flexible material such as Dynavar tape 58 and 60, FIG. 1. The lengths of tapes are attached to opposite side portions of the carriage 22, as will now be described. One length 60 of the tape is secured at one end 62 to the right side 64 of the carriage 22. The opposite end 66 of tape 60 passes rightwardly over a rotatable idler pulley or sheave 68 and is secured to an eyelet 70 in the outboard end 72 of a loading arm 74 pivotally mounted on a short stub shaft 76 located in an aperture 78, FIG. 2, in the panel 34. The arm 74 is biased in a clockwise direction by a relatively stiff coil spring 80, for purposes to be explained presently.

The other tape 58 has one end 82 attached to the opposite or left side 84 of the carriage 22, while its other end 86 passes leftwardly around a pulley or sheave 88 which is rotatably mounted on one end of a pivotal crank arm 90, for purposes to be described hereinafter, and the extreme end portion is secured by bolts 92 to a rotatable tape drum 94. Arm 90 is biased clockwise by means of a spring 95 secured to a bolt adjustably disposed in a slot in panel 34. The tape drum 94 is rotatably mounted on a rock shaft 96 and is actuated, in a manner and by means to be described presently, so as to permit the head carriage 22, under urging of loading arm spring 80 to move retilinearly over the recording surface 12 of the record member 10.

As viewed in FIG. 1, carriage 22 together with its head 24 is located in a so-called "home" or cocked position which is one position removed from or slightly to the left of the number one or zero track position, FIG. 1, as will be described hereinafter. The carriage 22 is effectively retained in this position by means also to be described hereinafter. The depending offset end 98 of lever 90 carries a follower roller 100 secured thereto by means of a short stud 102 and a C-ring in conventional fashion. The follower roller 100 is adapted to engage and ride upon the peripheral surface portion of a spiral cam 106 which is, like tape drum 94, disposed on the rock shaft 96. Spring 95 effectively biases roller 100 against the periphery of the spiral cam 106.

Figures 5, 6:
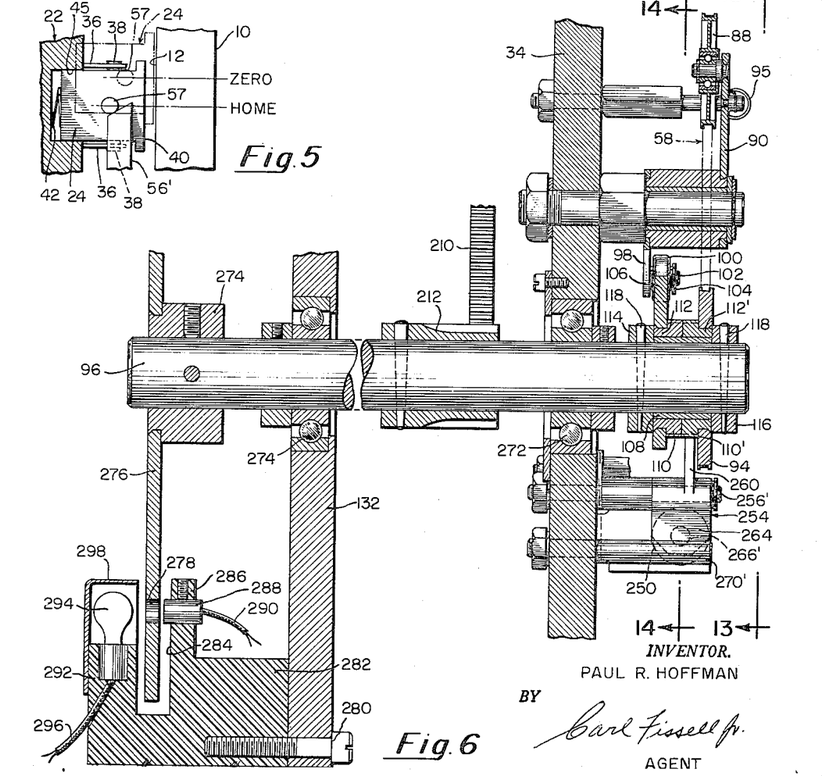
FIG. 5 is a detail view along the line 5—5 of FIG. 4 illustrating the transducer retracting cam.
FIG. 6 is a sectional view along the line 6—6 of FIG. 1.

Referring now to FIG. 6, the electromagnetic transducer or head set up mechanism for the present apparatus is further seen to include a bearing member in the form of a bushing 108 which is press-fitted to the rock shaft 96. Bushing 108 carries two similar confronting ten toothed wheels 110–110' having circular ridges 112–112' respectively thereon. Tape drum 94 is press-fitted to the ridge 112' of wheel 110' and forms a sub-assembly which is rotatable on the bushing 108. The spiral cam 106 is similarly press-fitted onto ridge 112 of wheel 110 and likewise forms a sub-assembly also rotatable on bushing 108. Inner and outer drive crank members 114 and 116 respectively, are secured to rock shaft 96 by means of tapered pins 118 passing through each crank and into and through the shaft 96. The inner crank 114 is disposed in confronting relation with the spiral cam 106 while the outer crank 116 is positioned in confronting relation with the tape drum 94. The two cranks thus tend to further position and retain the tape drum and spiral cam assemblies along shaft 96.

Figures 12, 13, 14:
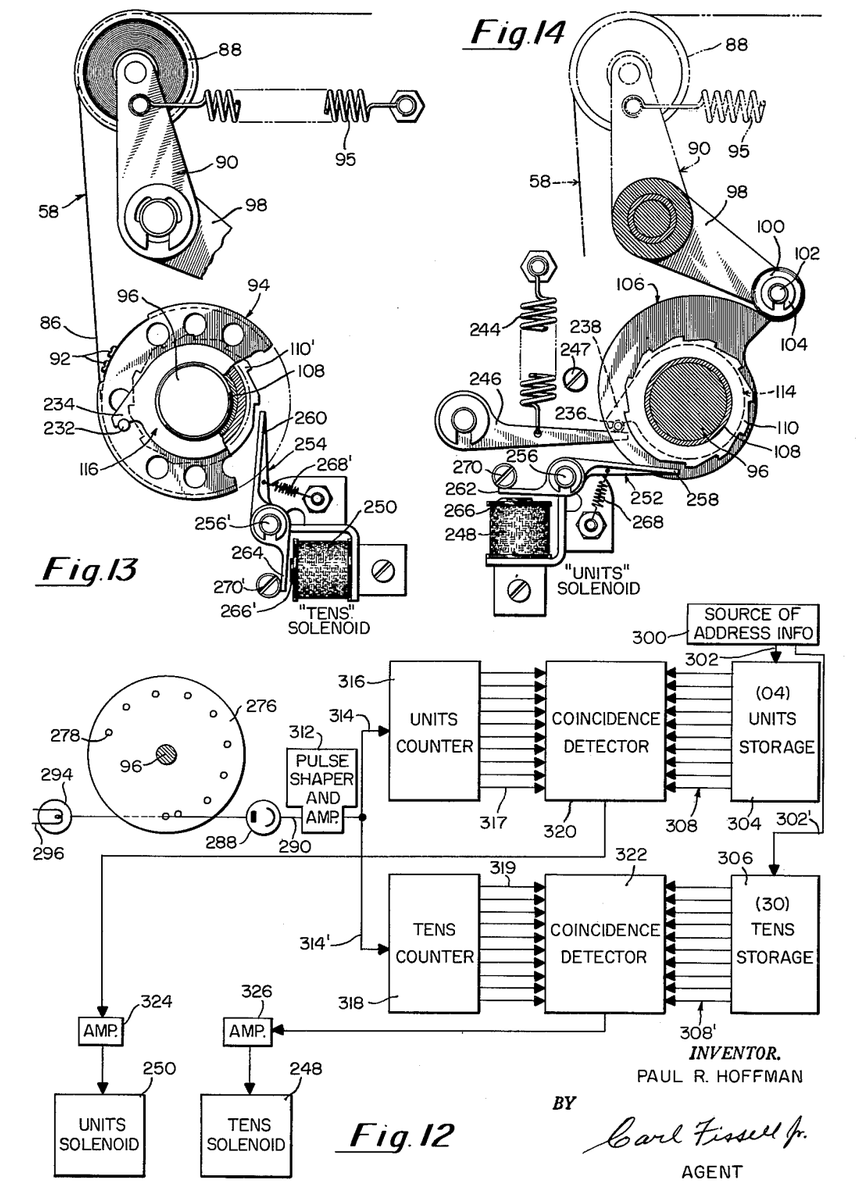
FIG. 12 is an electrical circuit diagram of the electrical control apparatus employed with the present invention.
FIGS. 13 and 14 are views along lines 13—13 and 14—14 respectively, of FIG. 6 showing the units and tens actuating mechanism.

The pitch of the teeth on each of the toothed wheels 110 and 110' as seen in FIGS. 13 and 14, is substantially identical. The angular distance or the spaces between adjacent teeth is approximately 31°. The recording areas or tracks 14 on member 10 are effectively located on .0050" centers, i.e., .0050 of an inch for each track.

As can be seen most clearly in FIGS. 14–18 inclusive, 31° of angular movement of the spiral cam 106 will cause the cam follower roller 100 to drop, rotating crank 90 through an angular distance equivalent to .0050" of tape. That is .0050" of tape will be moved past some zero point. If the spiral cam 106 is permitted to move one tooth on wheel 110, one track distance will be traversed by carriage 22, as seen most clearly in FIG. 18 wherein the cam 106 is detailed. Thirty-one degrees of rotation of the tape drum 94 will payout approximately one-half inch of tape. If the tape drum is permitted to move one tooth on wheel 110' approximately ten tracks will be traversed by the head carriage 22. By rotating the tape drum 94 an increment or a tooth at a time it is possible to payout or to move the head ten tracks at a time. Rotation of the spiral cam 106 a tooth at a time gives an equivalent distance of one track per tooth.

Figure 8:
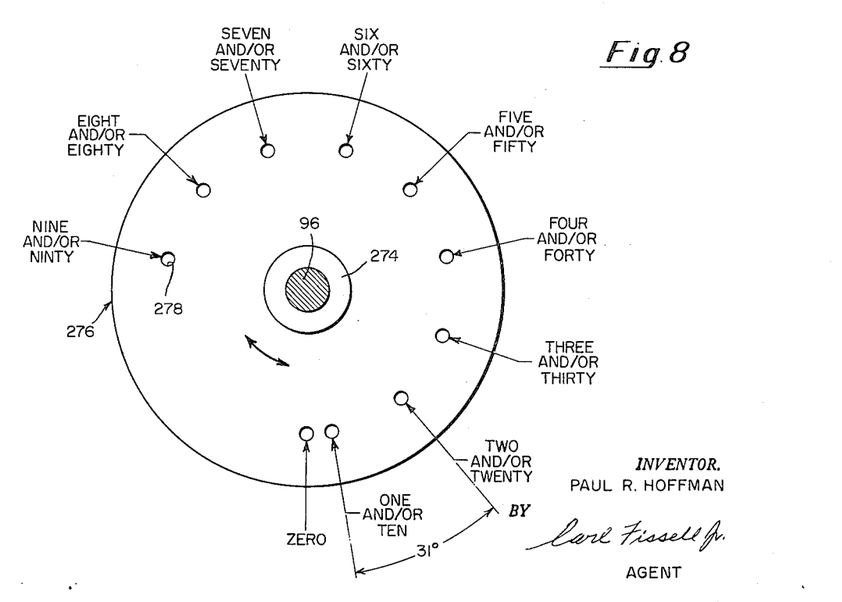
FIG. 8 is a front elevational view along the line 8—8 of FIG. 2 illustrating the timing disc employed with the present invention.

The tape drum 94 thus can be characterized as the tens digit mechanism while the spiral cam 106 can be characterized as the units digits mechanism. The ten teeth on each of the toothed wheels 110–110' thereby provide means for moving the head 100 positions or 100 tracks. As earlier set forth herein at the so-called "home" position, the head 24 is displaced or retracted away from the disc surface and the first track position slightly. As will be described hereinafter, this local positioning of the head carriage and head requires a certain amount of pre-travel of the head from "home" to the "zero" position as seen in FIG. 8. This distance is approximately equal to 6°.

Figure 2:
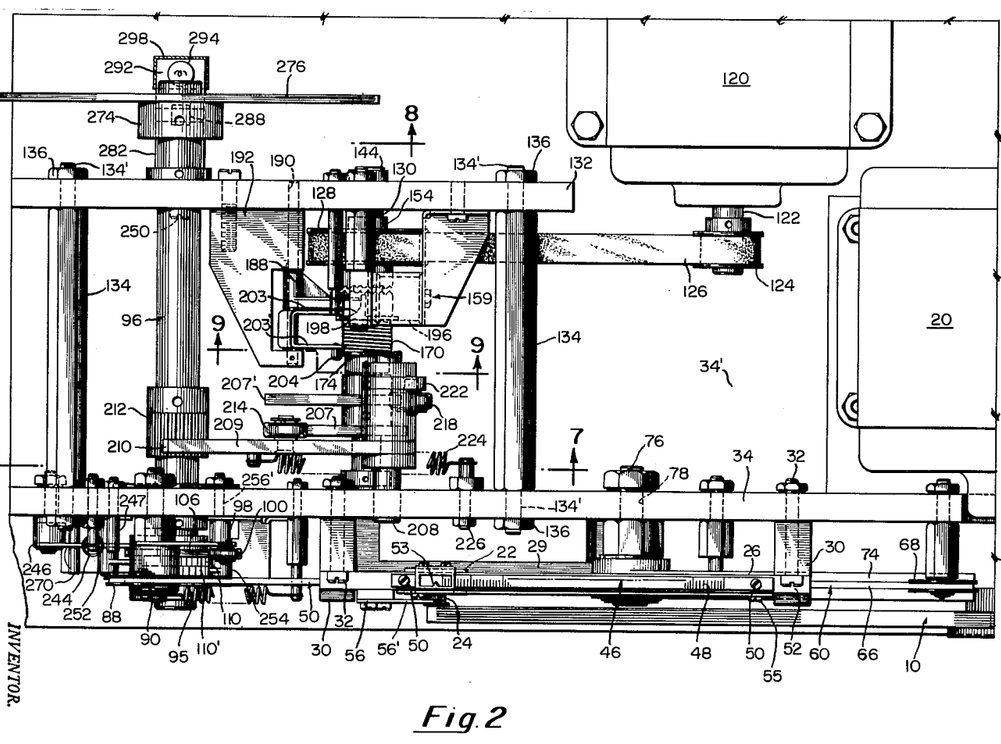
FIG. 2 is a plan view of the apparatus of FIG. 1.
Figure 3:
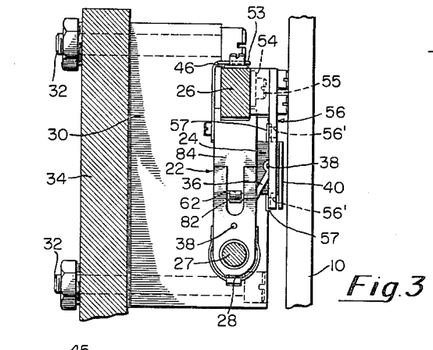
FIG. 3 is a sectional view along the line 3—3 of FIG. 1.

The main drive for the indexing and head set-up mechanism, partially aforedescribed, is supplied through the medium of an electric driving motor 120, FIG. 2. The output shaft 122 of the motor 120 is provided with a pulley 124. A belt 126 drivingly connects pulley 124 with input drive pulley 128 secured to and rotatable with shaft 130. Shaft 130 is freely rotatable and extends between the panel member 34 and a secondary supporting panel or bracket 132 adjacent and parallel therewith and located behind panel 34. The two panels are supported in spaced apart relationship by means of cross posts 134 extending therebetween and attached at opposite ends by nuts 136 threaded over reduced end portions 134'.

Figure 11:
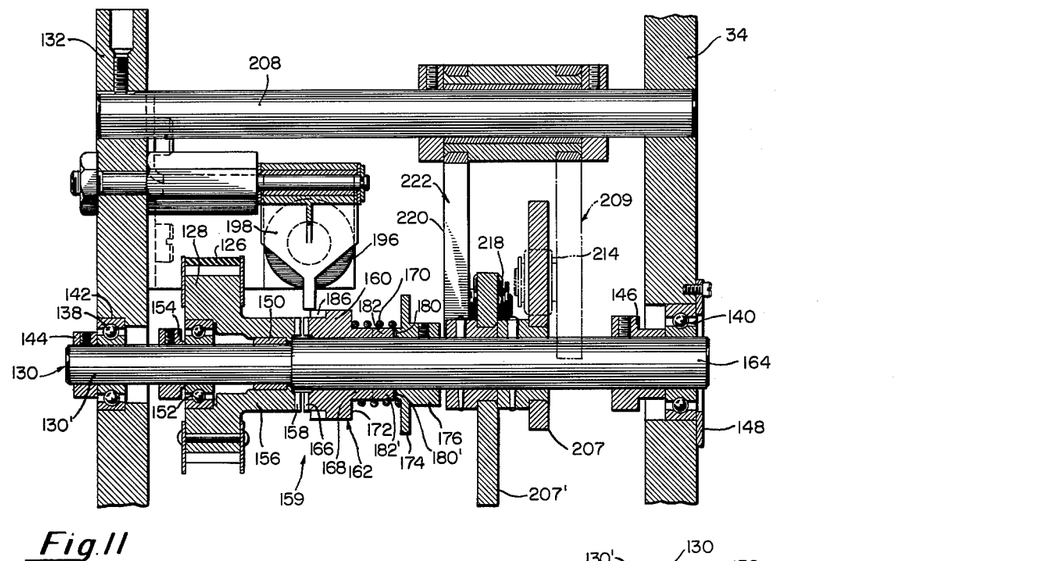
FIG. 11 is a view along the line 11—11 of FIG. 9.

As seen most clearly in FIG. 11, shaft 130 is journalled in end bearings 138 and 140, located in panels 132 and 34 respectively. Bearing 138 is retained in recess 142 in member 132 by means of a collar 144 and a set screw.

Bearing 140 is adjustably retained in panel 34 by means of a collar 146 and a set screw on one side thereof and a demountable end ring 148 secured to the panel by means of a screw or bolt. The pulley 128 is rotatably journalled on a reduced portion 130' of shaft 130 by means of a sleeve bearing 150 at one end thereof and a ball bearing 152 at the opposite end thereof and is adjustably positioned on shaft 130 by means of a collar 154 and a set screw. The pulley 128 is provided with a hub portion 156 terminating at its rightward end, FIG. 11, in a serrated rim forming clutch teeth 158 of a one half revolution control clutch 159, as will now be described.

For transmitting motion from pulley 128 to the driven shaft 130, the driven clutch part comprises the enlarged portion 160 of a tubular cylindrical member 162, which is linearly slidable on an enlarged diameter portion 164 of shaft 130. The end face of member 162, which is juxtaposed to the clutch teeth 158, is provided with teeth 166 to mesh with the teeth 158 and thereby transmit motion from the drive part of the clutch to the driven part. Member 162 also has a hub portion 168 of reduced diameter extending into a coil spring 170, FIG. 11, which is held under compression between the shoulder or end 172 of the member 162 and a camming flange 174 formed as an integral part of a bushing 176. This flange is formed with two diametrically disposed cam lobes 178–178', FIG. 9, for a purpose which will presently be described. Bushing 176 is made fast to the shaft portion 164, as by a set screw, to transmit rotation of the clutch driven member 160 to the driven shaft 130, through the medium of transverse square slots 180, FIG. 10, diametrically disposed in the end of bushing 176, such slots 180 telescoping with two similarly diametrically disposed square lugs 182 projecting from the juxtaposed end 184 of clutch member 162. The overall length of the driven clutch member 162 is such as to permit declutching of the parts when the member 162 is shifted to the right, compressing spring 170 and without disengaging lugs 182 from slots 180.

Figure 9:
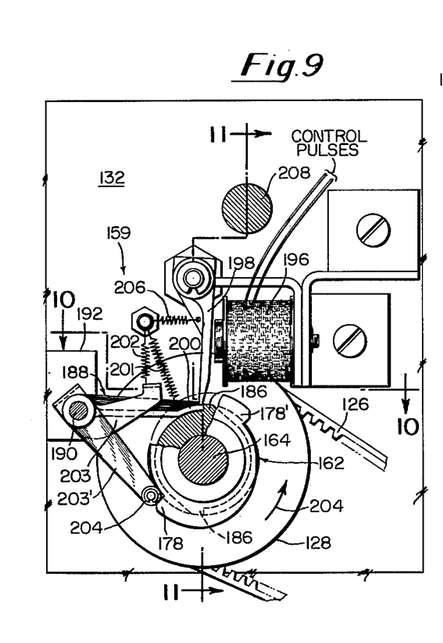
FIG. 9 is a view along the line 9—9 of FIG. 2.

In order to perform the declutching operation the periphery of the member 162 is formed with two quadrant-like cams 186–186', FIG. 9, disposed 180° apart to ride successively into the path of a clutch shifting dog 188 which is pivotally mounted by pin 190 to a fixed bracket 192 to swing toward and away from the periphery of the member 162. The forward free end of dog 188 has an arcuate cam lobe 194 which when in the path of either of cams 186 or 186' will force the member 162 linearly to the right, FIG. 11, along shaft portion 164 against spring 170 so to remove teeth 166 from engagement with teeth 158 thus to stop rotation of shaft 130. The dog 188 is normally biased to declutching position, FIG. 10, but is shifted out of the path of cams 186–186' when the clutch is to operate as a driving means, as hereinafter set forth. Half revolution clutch control solenoid 196 may be included in any selected electrical circuit for timed operation, as will be described hereinafter. A clutch of the type aforedescribed is shown in Patent No. 2,957,962 to Walter Hanstein et al., assigned to the same assignee as the present invention.

The shifting action is accomplished, as seen by reference to FIG. 9, by the disengagement of the outboard end of the solenoid clapper 198 with the end of dog 188. When solenoid 196 is energized, for example, by the application of an "operate" pulse thereto, its clapper 198 is drawn rightwardly, out of engagement with dog end 200, whereupon spring 201 lifts the dog 188 out of the path of cams 186–186' so that the compression spring 170 can shift the clutch member 162 linearly to the left, FIG. 11, to mesh the two sets of clutch teeth 158 and 166 and cause member 162 to be rotated.

Figure 10:
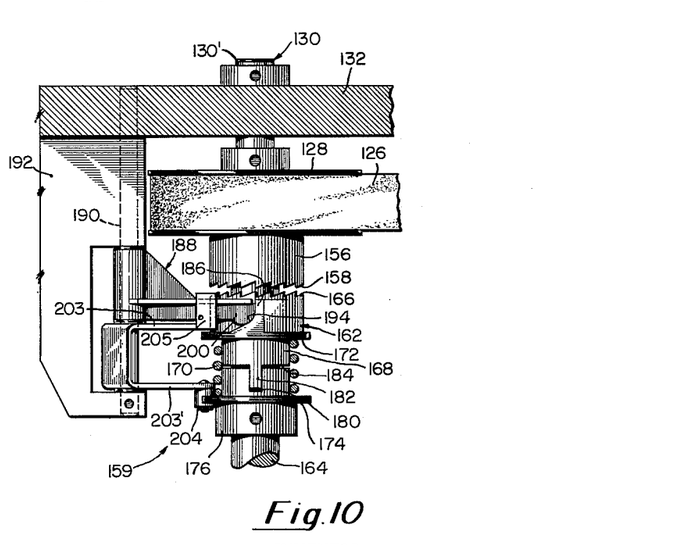
FIG. 10 is a view along the line 10—10 of FIG. 9.

Substantially simultaneously with the foregoing, spring 202 lifts the U-shaped clutch resetting mechanism, including reset links or arms 203 and 203' upwardly, permitting cam follower roller 204 on the depending end of arm 203' to ride along the surface of cam 178'. Continuous rotation of shaft portion 164 in the direction of the arrow 204' causes the reset links 203 and 203' to be moved arcuately downwardly—the link 203' following the gradually increasing diameter of cam lobe 178'—permitting the follower roller 204 to finally drop in behind the cam lobe 178' and causing the tab 205, overlapping the elongated vertical ridge on dog 188 to pull the latter downwardly thereby re-engaging the end 200 of the dog 188 with the cam lobe 186 to disengage the clutch, stopping the shaft after ½ revolution or 180° of shaft movement. The solenoid 196 is now deenergized permitting its clapper 198 to be pulled leftwardly, FIG. 9, by the tension spring 206 attached thereto, to engage the end of the clapper with the end of the dog 188 and hold the clutch mechanism in the position shown in FIG. 9. Rotation of member 162 is transmitted to bushing 176 and from it to the driven shaft 130. Deenergization of solenoid 196 causes clapper 198 to snap the dog against member 162 so that its camming end 194, FIG. 10, is met by one of cams 186 or 186' whereupon the clutch member is rapidly shifted to declutching position. Rotation of the shaft 130 can be timed to comprise only a half revolution thereof or multiple increments of half revolutions according to the design of the circuit control for solenoid 196.

Figure 7:
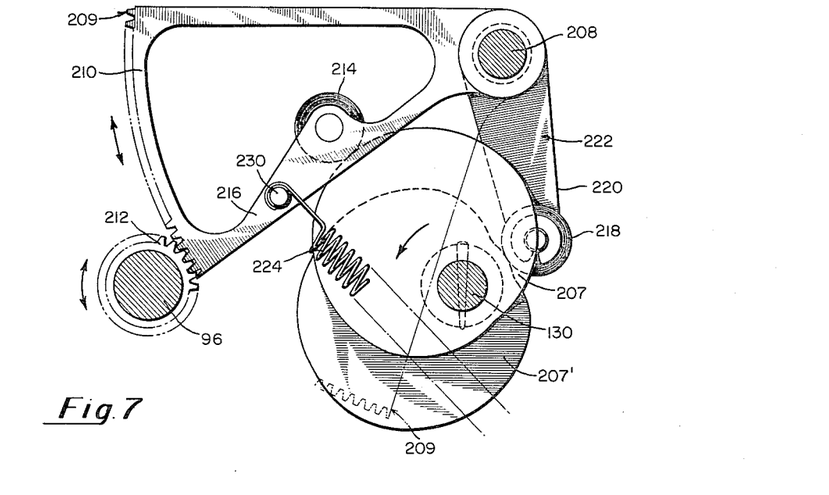
FIG. 7 is a view along the line 7—7 of FIG. 2 illustrating the cam and sector drive mechanism for the present invention.

Shaft 130 for practical purposes is considered to be the clutch drive output shaft and, as will be pointed out more fully as the description proceeds, in conjunction with the set up mechanism earlier described herein is used, to control the movement of the transducer carriage 22 and its head 24 back and forth across or over the surface of the disc. Disposed on the forward end of enlarged portion 164 of the shaft 130 are two complementary cams 207–207' rockably, pivotally mounted as by pins thereto. Rotatably disposed on a shaft 208, extending between panels 34 and 132, and projecting leftwardly away therefrom, FIGS. 7 and 11, is a substantially triangularly shaped gear segment or sector 209 provided with a set of peripheral teeth 210. The gear teeth 210 are in mesh with the teeth of a pinion 212 which is secured as by a pin, FIG. 6, to and rotatable with drive shaft 96, earlier described herein. Rocking movement of the gear segment 209 from the full line to the dotted line position will thus impart rotary motion to the pinion gear 212 and thus to the shaft 96.

To this end, a first follower roller 214 is mounted in suitable fashion in one of the legs 216 of the segment 209 intermediate the shaft 208 and teeth 210 and in rolling contact with the cam 207. A second follower roller 218 is mounted on the depending end 220 of a crank arm 222 secured to and movable with the segment 209. Follower roller 218 is in rolling contact with cam 207'. A tension spring 224, mounted at one end to a bolt 226, FIG. 1, slidable in a slot 228 in the front panel 34, and at its other end to a stud 230, FIG. 7, on segment arm 216, biases the segment in a counterclockwise direction. It is seen from the foregoing that in response to a signal from the electrical control circuitry, as will be explained later on, energization of the half revolution clutch solenoid 196 will permit the drive shaft 130 to rotate causing the complementary cams 207 and 207' to make a half revolution so that the gear segment 209 takes a single stroke from the full to the broken line position thereby rotating the drive shaft 86 a similar amount.

As earlier described in connection with FIG. 6, the tape drum and spiral cam assemblies are each provided with a respective toothed ratchet wheel 110–110' each of which is rotatable on the shaft 96. As shown most clearly in FIGS. 13 and 14, which will be discussed jointly, the tape drum 94 is provided with a follower pin 232 which projects outwardly therefrom to engage the nose 234 of the reset crank 116, FIG. 13. Likewise the spiral cam 106 is provided with a follower pin 236 also projecting outwardly therefrom to be engaged by the nose 233 of the reset crank 114, FIG. 14.

Since both of the cranks are pinned to the shaft 96 and since the latter is effectively held in place by the gear segment 209 through the pinion 212 and the half revolution clutch, the large spring 80, FIG. 1, on the crank or loading arm 74 is prevented from pulling the transducer carriage 22 rightwardly, as viewed in FIG. 1. The entire mechanical arrangement including the crank arm 74 is thus spring loaded. If the crank 116 is rotated, the tape drum 94 will rotate under the urging of the spring 80 on the loading arm 74 causing the head 24 to move rectilinearly along the guide rails 26 and 28 over the disc.

The cam follower 100 disposed on the depending arm 98 of the member 90, and riding on the surface of the spiral cam 106 also is a means for paying out tape and thus for moving the head. The second drive crank 114 and pin 236 restrain the cam follower 100 from driving the cam 106 through a slight pressure angle which exists on the spiral cam through the spring 95 and the spring 80 both of which tend to force the follower downwardly, FIG. 14, against the cam surface. The spring 80 exerts a force on the tape pulley 88 which exerts a force on the cam follower lever 90 which attempts to rotate the cam follower 100 through the pressure angle due to the slope of the cam and enables the cam to be driven through that pressure angle. Thus, the cam 106 may be made to creep in one direction. Likewise the lever 90 can be pivotally moved to a variety of positions, FIG. 16, thus to move the head structure.

In order to accelerate the spiral cam 106 through its initial portion of its rotative cycle, since it must be rotated up to operating velocity against the downward pressure of the follower 100, a booster spring 244 is employed. Spring 244 operates through a spring lever 246, the rightwardly extending end of which presses against the pin 236 and urges rotation of the spiral cam 106 by causing the pin 236 to follow the crank 114. The spring lever 246 in its vertical travel limits against the stop member 247. It can be seen then that spring lever 246 transmits energy from the spring 244 through the cam 106 by means of the follower pin so that under the initial acceleration there is enough force to make the follower pin and cam follow the crank 114 on the drive shaft 96 and permit the loading arm spring 80 to effectively move the head. The two means are thus provided by the present apparatus for paying out tape every time a head set up or indexing cycle is called for. Every time a pulse is applied to the half revolution clutch solenoid 196 and the head apparatus is in the "home" or retracted position, tape will be fed or payed out and the transducer carriage 22 will move over the disc as desired.

While the present mechanism could have been a "non-return-to zero" type with certain modifications being made to the clutching and de-clutching mechanism and the tape feed mechanism, the preferred and illustrated embodiment thereof is of the so-called "return-to-zero" type in that the head must be returned from wherever it has been positioned to its "home" position before another head moving cycle can be initiated.

As seen in FIGS. 13 and 14, in addition to the aforedescribed assemblies, there is provided a units magnet 248 and a tens magnet 250. Associated with each magnet 248 and 250 is a clapper-pawl combination, members 252 and 254 respectively. Each member 252 and 254 is rockably mounted on a respective pivot pin 256 and 256' so that the longer arm or pawl portion 258 and 260 thereof projects outwardly into the path of movement of its respective toothed ratchet wheel 110–110' while the shorter arm or clapper portion 262 and 264 of each member projects over its respective magnet core 266–266' as shown. The pawl portion 258 and 260 of each member is biased away from its associated wheel 110–110' by means of a respective spring member 268–268'. In its de-energized or standby condition each clapper pawl combination member is free and clear of its associated wheel 110– 110' and limits against a respective stop member 270–270'.

Figures 15, 16:
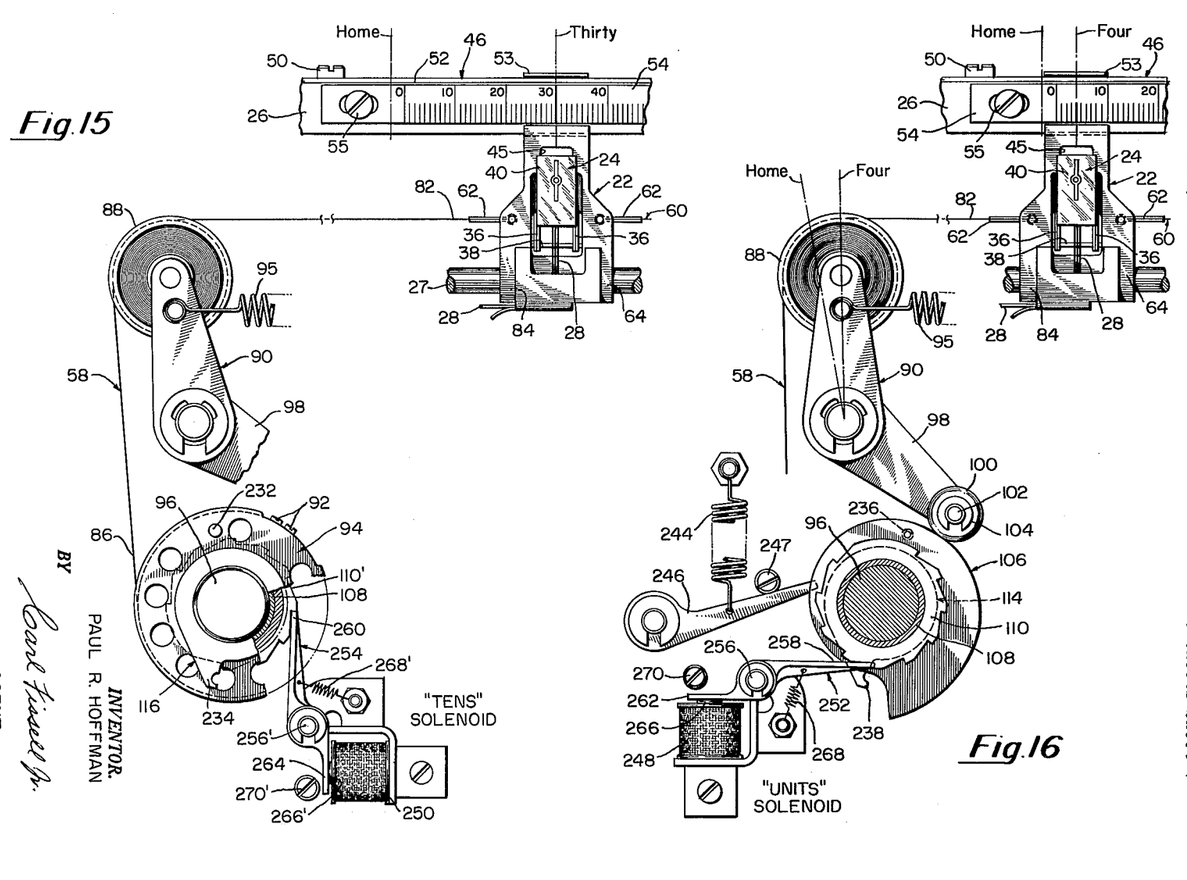
FIG. 15 is an operational view of the tens solenoid selection mechanism.
FIG. 16 is an operational view of the units solenoid selection mechanism.
Figure 17:
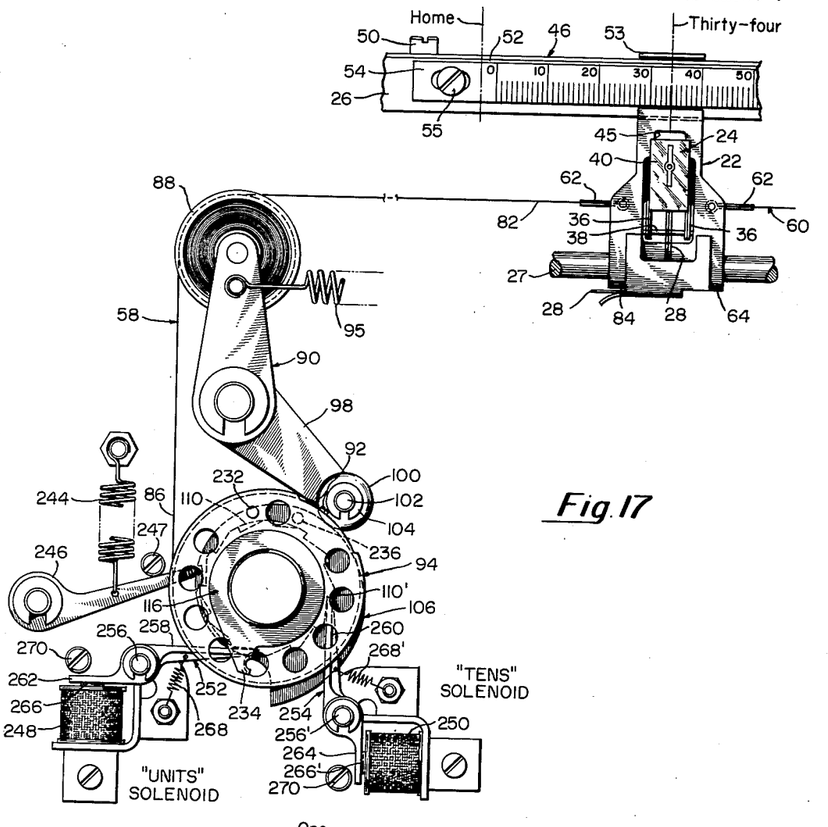
FIG. 17 is a combined operational view of the apparatus of FIGS. 15 and 16.
Figure 18:
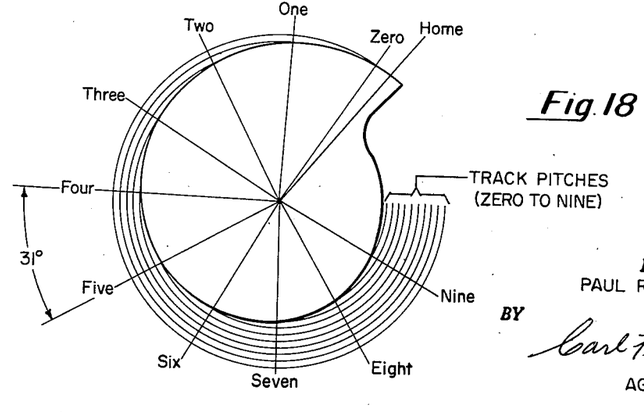
FIG. 18 is a detail view of the spiral cam of the present invention.

Still referring jointly to FIGS. 13 and 14, it is noted that both solenoids 248 and 250 are illustrated in their de-energized condition so that the pawl portions 258 and 260 are out of engagement with the "zero" tooth on their respective gear wheels 110–110'. The teeth are numbered counterclockwise starting with the zero tooth which is the tooth immediately adjacent the pawl. The angular distance between the pawl 258, for example, and the "zero" tooth on the member 110' is substantially equivalent to the distance the shaft 96 carrying a photo disc 276, hereinafter described, must be rotated in order to position the head from "home" to the zero track. And so with the pawl cam 106, it likewise must rotate through the angle separating the pawl 258 from the tooth on member 110 to move the head from "home" to the "zero" track. Cumulatively then, the total angular travel of both members 110 and 110' is equal to the travel of the head from the home position to the zero track as shown in FIGS. 15, 16 and 17.

As seen in FIGS. 1, 2, 6 and 7, drive shaft 96 is journalled in bearings 272 and 274 disposed respectively in, and supported between the vertical members 34 and 132. The drive pinion 212, as before described, is disposed intermediate the ends of the drive shaft 96 and has its toothed periphery in engagement with the periphery of the sector gear 210. The inboard or rear end of shaft 96 projects away from the vertical member 132 and carries the rotatable disc-like member 276 which is secured to the end of shaft 96, by means of a bushing 274 to which disc 276 is press-fitted and a set screw. The disc 276, seen most clearly in FIG. 8, comprises a rigid annular member and is provided with a series of ten slots or holes 278 disposed circularly therearound. Except for the "zero" hole, the holes 278 are located 31° apart center to center. The "zero" and "one" holes are located relatively closely adjacent one another since only a slight amount of pretravel is necessary to position or locate the head relative to the first track on the disc, as earlier described.

Secured to the lower portion of the upright member 132, FIG. 6, as by bolts 280 is a block 282 of rigid material having a vertically disposed slot 284 therein. In the vertically projecting board arm portion 286 is located a photocell 288 including the lead wires 290 which extend therefrom. The photocell is adjustably mounted in the upright arm by means of a set screw. In the oppositely disposed upright arm 292 is located a light source 294 which in the present embodiment is a light bulb disposed in a conventional socket including lead wires 296 extending therefrom. A shield member 298 is provided for directing and concentrating the light from the light source into and through the holes in the disc-like member to the photocell 288.

The first hole in the disc, i.e., the hole to the left of the "one" and/or "ten" hole in FIG. 8 is prealigned with the photocell and the light source so that the first pulse provided thereby is immediately available to the electrical control circuitry as will be apparent hereinafter to position the head at the zero track on the disc should this track be called for.

In positioning the head 24 adjacent the surface of the disc 10 an address, so called, is used to select a track from among the plurality of tracks previously recorded on the disc 10. Thus if it is desired to cover track 00 to track 99, it is clear that at least two decimal digits are required for 100 positions. A source of address information 300, FIG. 12, is or may be a computer, adding machine or a typewriter, for example, that has the necessary facilities for producing electrical outputs corresponding to the decimal digits from 0 to 9 or from 00 to 99.

Referring to FIGS. 1, 2, 6 and 12, which will be discussed simultaneously, the address information is fed simultaneously from the source 300 over the lines 302–302' to units and tens storage members 304 and 306 respectively. In effect, the units and tens storage members can be likened to two single pole ten position switches whereby an input signal pulse selects one of the ten lines 308 for the units and/or one of the ten lines 208' for the tens. The units storage device 304 may be a counter or divider of the type which produces an output for each input pulse received while the tens storage device 306 may be a counter or divider of the type which produces an output for every ten input pulses received. If it is desired to call for track 34 for example, it is necessary to select output line 3 in the tens storage member 306, counting from the top down in FIG. 12, tnd output line 4 in the units storage member 304. Having thus established the track to be selected, the apparatus operating as hereinafter described, will then signal for the head selection mechanism, including the tape drum and spiral cam assemblies to begin operation. This is initiated by means of an electrical signal which is applied to the half revolution clutch control solenoid 196. Actuation of the half revolution clutch permits the shaft carrying the drive cams and sector gear to revolve rotating the photodisc 276 and the two crank members 114 and 116. The photodisc in combination with the light 294 and the photocell 288 now causes a pulse to be transmitted to the electrical control circuit, for each of the ten hole positions. In effect, indicating a "zero" position, a "one" position, a "two" position and so on for each hole on the disc.

The electrical output pulses from the photocell 288 are applied over lead 290 to suitable amplification and pulse shaping apparatus 312. Thereafter the shaped and amplified pulses are applied simultaneously over leads 314 and 314' to a units counter 316 and a tens counter 318. These two counters could be stepping switches. That is to say, electromechanical stepping switches that would step fast enough to keep up with the pulses, could be employed. However, for practical purposes a device such as a beam switching tube or solid state physical apparatus could be used thus to provide an all electronic counter. The units counter 316 is of the type which produces a pulse output for each input pulse. The tens counter 318 on the other hand produces a single pulse output for every ten input pulses applied thereto.

Electrically interposed between the units counter 316 and the units storage device 304 is a units coincidence detector 320. Leads 317 connect the counter 316 to the detector 320. A tens coincidence detector 322 is electrically interconnected between the tens counter 318 and the tens storage apparatus 306. Leads 319 connect the tens counter 318 to the detector 322. The two coindence detectors effectively attempt to establish coincidence between the pulse number data in the two counters and the pulse data in the storage elements. Voltage coincidence detectors 320 and 322 comprise essentially "AND" circuits which sense coincidence between voltage levels applied over leads 308-308' with voltage pulses derived from counters 316 and 318. Immediately that coincidence is detected, output pulses of sufficient strength are transmitted via amplifiers 324 and 326 to the units and tens solenoids 248 and 250. Units such as these herein called for, e.g., counters, coindence detectors, storage devices, dividers and stepping switches, are well known to the practitioner in these arts and are readily available.

*Operational description*

In the example aforementioned, it was desired to select disc track 34. Rotation of the disc 276 before the photocell 288 as the shaft 96 turns sends four pulses to the two counters 316 and 318. The units coincidence detector 320 detects coincidence between these four pulses and the four stored in the units storage device 304 and forthwith sends a pulse through the appropriate amplifier 324 to energize the units solenoid 250 pulling in its clapper and stopping rotation of cam 106 at position 4, as seen most clearly in FIG. 16. The tens counter 318 has already counted to the three position. The tens coincidence detector 322 recognizes coincidence between what is stored in the tens storage member 306 and the three pulses counted by the counter 318. A control pulse is then sent through amplifier 326 into the tens solenoid 248 to cause its pawl to stop rotation of the tape drum 94, as clearly shown in FIG. 15. Having thus stopped the tens tape selection mechanism at three and the units tape selection mechanism at four the apparatus has measured out 34 increments of tape and thus will position the head 24 at the appropriate 34th track on the disc 10, as seen in the composite view of FIG. 17. The spring 80 provides sufficient energy to keep the wheels 110–110' pressed (counterclockwise) against their respective pawls preventing under travel or track misselection. The energizing pulse to each magnet 248–250 is of sufficient duration for each set up mechanism to settle down after each track selection. Once the head carriage has been set up, i.e., positioned over the selected area or track on the disc, the one half revolution clutch 159 has completed its operation so that all the apparatus is at rest.

Whenever the associated computation apparatus, not shown, is ready to apply write pulses to the head assembly 24 or to pick up information from the disc it does so over the leads 28. In the meantime, the head remains in the position where it has been sent by the selection mechanism. If the half revolution clutch mechanism is again pulsed for example, by the closure of a simple single pole switch (not shown) interposed in the electrical leads supplying "control pulses" to the solenoid, FIG. 9, the drive shaft 96 will be oscillated back to its original position. The cranks 114 and 116 pick up the drive pins 232 and 236 in the tape drum 94 and the spiral cam 106, respectively, and restore the latter members to their home positions, FIGS. 13 and 14, likewise repositioning the head to "home" and camming the latter member upwardly away from the disc surface. Thus, one signal to the half revolution clutch solenoid moves the head out and the next signal to the clutch will restore the head to the "home" position. The control pulse which is used to reset the head to "home" is or may be used to reset the counters 316 and 318 and the storage devices 304 and 306 to zero ready for the next operation.

With respect to the "zero" position and its location ahead of the "one" position, this difference in spacing has to do with the speed of operation of the apparatus. Since the tape is not up to speed at the "zero" position it is not required that it have as much lead time as is necessary for the other positions, namely, 31° of rotation. The other positions have to have more lead because the head is moving faster so that there has to be more advance notice given to stop the head in these other positions.

What is claimed is:

1. Electromagnetic transducer control and positioning apparatus comprising:
    (a) an electromagnetic transducer including one or more read-record heads,
    (b) a rotatable record member having a magnetizable surface thereon, said magnetizable surface being divisible into a plurality of discrete recording areas circularly disposed in concentric fashion around said record member,
    (c) means to rotate said record member,
    (d) means engageable with said transducer for rectilinearly guiding the same over the magnetizable surface of said record member in hydrodynamic airbearing relationship therewith,
    (e) a pair of coaxially mounted escapement members,
    (f) oppositely disposed electromagnets each including an individual clapper operably engaging a respective one of said escapement members, each electromagnet being effective when energized to control the movement of the associated escapement member,
    (g) a spiral cam operably associated with said escapement members and including means interconnecting said cam and said transducer,
    (h) a rockable follower member operably associated with said interconnecting means and arcuately movable in response to movement of said cam effective thereby to permit said transducer to move in one direction, (i) a lever arm engageable with said cam and including means for accelerating the initial rotation of said cam, (j) a spring biased loading arm operably associated with said transducer member and effective to drive said transducer in one direction to an operative position relative to said record member upon release of said escapement members, (k) drive means including a cam actuated sector gear and clutch effective when energized to cause said cam to move in an opposite direction so as to restore said transducer to an inoperative position relative to said record member, and (l) electrical control means synchronously operably associated with said cam and said escapement members for controlling the advance of said transducer to one of the tracks of said record member in response to energization of said electromagnets.

2. Electromagnetic transducer control and positioning apparatus comprising:

(a) an electromagnetic transducer including one or more read-record heads, (b) a rotatable record member having a magnetizable surface thereon, said magnetizable surface being divisible into a plurality of discrete recording areas or tracks circularly disposed in concentric fashion around said record member, (c) means automatically, adjustably biasing said transducer toward said record member, (d) means to rotate said record member, (e) means engageable with said transducer for rectilinearly guiding said transducer in straight line motion over the magnetizable surface of said record member in hydrodynamic airbearing relationship therewith.

(f) a cam plate adjacent to one end of said spaced members, (g) a cam follower carried by said transducer engageable with said cam plate effective thereby for displacing said transducer relative to said record member, preventing said transducer from accidentally contacting and damaging the surface of the record member, (h) a pair of concentric escapements each having a projecting member, (i) oppositely disposed electromagnets each including a clapper engageable with a respective one of said projecting members and effective when energized to control the movement of the associated escapement member, (j) a spiral cam operably associated with said escapement members, (k) a cam follower operably engageable with said spiral cam and arcuately movable relative thereto and including means biasing the same in one direction and effective upon movement of said cam for effecting movement of said transducer, (l) an elongated loading arm including a coiled spring biasing the same in one direction and operably associated with said transducer member effective when released to drive the transducer to a selected track position on said record member, drive means selectively engageable with said cam for moving said transducer in a direction opposite to that in which it is driven by means of said loading arm, and (m) electrical control means operably associated with said escapement members effective to control the incremental advancement of said escapement members effectively positioning said transducer adjacent the tracks of said record member in response to energization of said electromagnetic means.

References Cited by the Examiner

UNITED STATES PATENTS

| | | | |
|---|---|---|---|
| 2,597,866 | 5/52 | Gridley | 340—347.3 |
| 2,832,841 | 4/58 | Eldridge | 340—174.1 |
| 2,852,762 | 9/58 | MacDonald | 340—174.1 |
| 2,914,752 | 11/59 | MacDonald | 340—174.1 |
| 2,994,856 | 8/61 | Dickinson | 340—174.1 |
| 3,007,144 | 10/61 | Hagopian | 340—174.1 |
| 3,009,759 | 11/61 | Johnson | 340—174.1 |
| 3,021,512 | 2/62 | Welsh et al. | 340—174.1 |
| 3,025,710 | 3/62 | Muffley | 340—174.1 |
| 3,057,970 | 10/62 | Brunner | 179—100.2 |

FOREIGN PATENTS

| | | |
|---|---|---|
| 750,294 | 6/56 | Great Britain. |

OTHER REFERENCES

Publication I: Magnetic Disk, Random Access Memory IBM Journal, January 1957, pp. 72–75.

IRVING L. SRAGOW, *Primary Examiner.*

BERNARD KONICK, *Examiner.*